United States Patent
Kosbau et al.

(10) Patent No.: US 12,370,876 B1
(45) Date of Patent: Jul. 29, 2025

(54) CHASSIS MOUNTING MEMBERS FOR AN ELECTRIC VEHICLE

(71) Applicant: Endera Corporation, Casper, WY (US)

(72) Inventors: Thomas Kosbau, Brooklyn, NY (US); Alfredo Gonzalez, Corona, CA (US); Enrique Garcia, San Gabriel, CA (US); Shashvat Mehta, San Gabriel, CA (US); John Joseph Walsh, Casper, WY (US)

(73) Assignee: Endera Corporation, Casper, WY (US)

( * ) Notice: Subject to any disclaimer, the term of this patent is extended or adjusted under 35 U.S.C. 154(b) by 345 days.

(21) Appl. No.: 17/973,054

(22) Filed: Oct. 25, 2022

Related U.S. Application Data

(60) Provisional application No. 63/271,610, filed on Oct. 25, 2021.

(51) Int. Cl.
*B60K 1/04* (2019.01)
*B60L 50/60* (2019.01)

(52) U.S. Cl.
CPC .............. *B60K 1/04* (2013.01); *B60L 50/66* (2019.02); *B60K 2001/0438* (2013.01)

(58) Field of Classification Search
CPC .... B60K 1/04; B60K 2001/0438; B60L 50/66
See application file for complete search history.

(56) References Cited

U.S. PATENT DOCUMENTS

| | | | |
|---|---|---|---|
| 667,189 A * | 2/1901 | Condict | B60L 50/66 180/65.1 |
| 10,559,794 B1 * | 2/2020 | Slovesko | B60L 3/0007 |
| 2008/0160394 A1 * | 7/2008 | Takasaki | B60K 1/04 429/96 |
| 2024/0262422 A1 * | 8/2024 | Garimella | B62D 21/11 |

* cited by examiner

*Primary Examiner* — Bryan A Evans
(74) *Attorney, Agent, or Firm* — Rutan & Tucker, LLP

(57) ABSTRACT

The mounting infrastructure is selected to support a plurality of battery packs including a first battery pack positioned between the second segment of first frame rail and the second segment of the second frame rail. For instance, a first mounting device including a battery support member and a pair of mounting brackets. Each of the mounting brackets includes an edge plate arranged proximate to a lengthwise side of the first battery pack when installed, an engagement plate to engage with a battery support member adapted to support the first battery pack, and an affixation member that, when installed to the first frame rail and second frame rail, is oriented to retain the engagement plate in parallel to the lengthwise side of the first battery pack despite the second segments being inwardly angled. Other types of mounting devices to support each of the multiple battery packs is described.

13 Claims, 6 Drawing Sheets

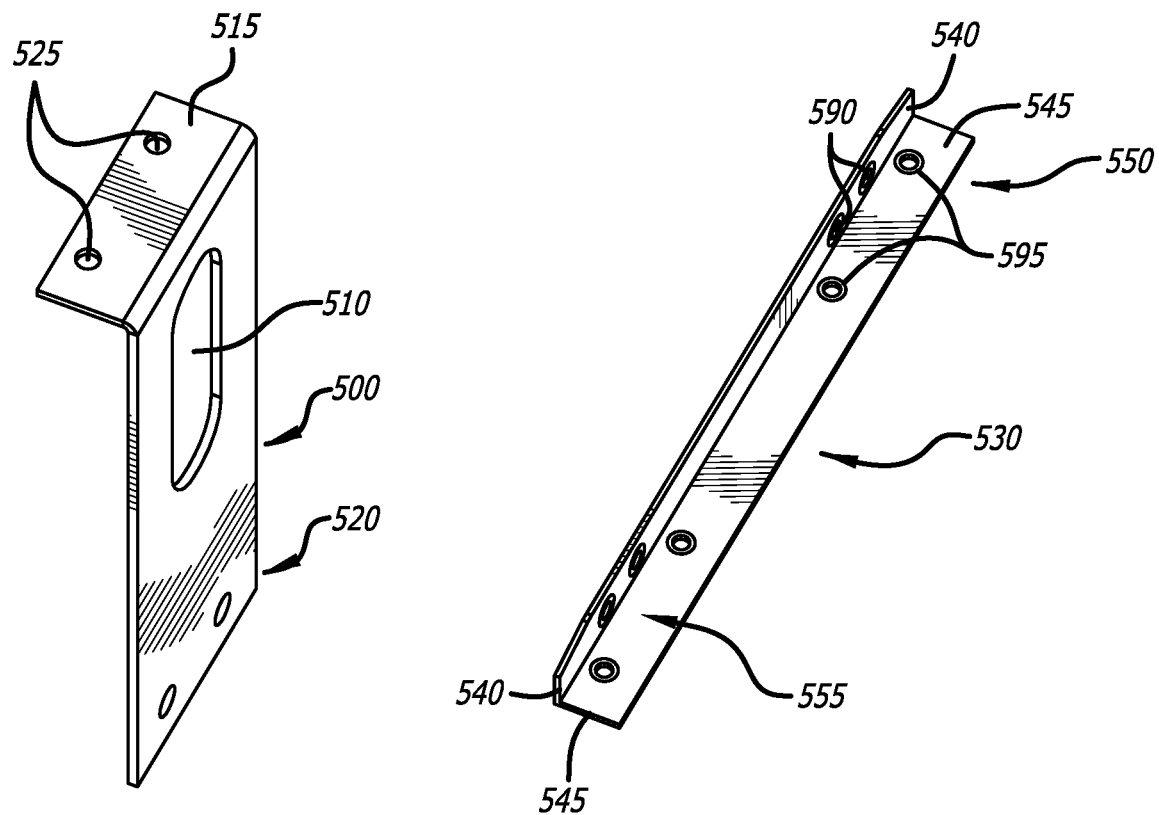
FIG. 5A
FIG. 5B
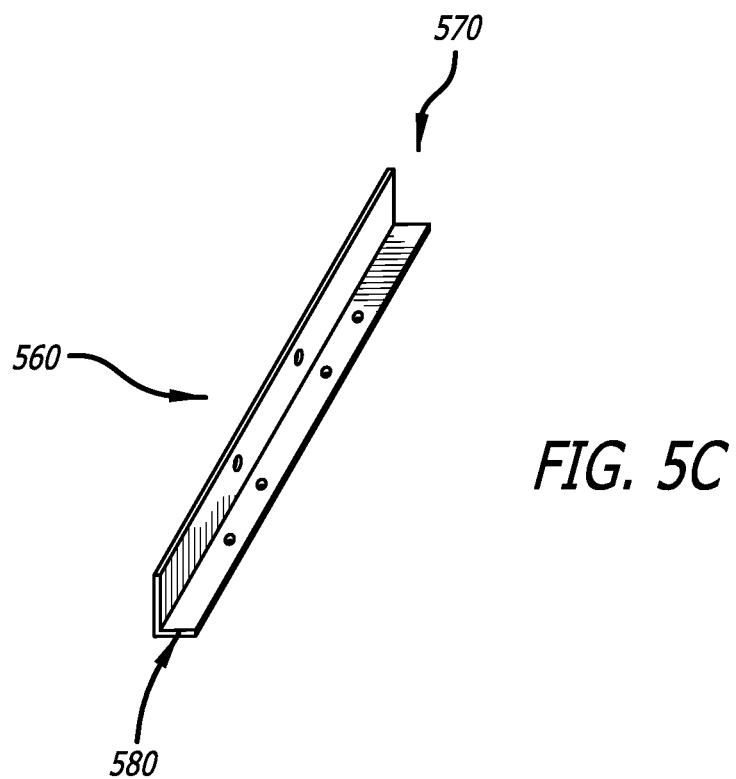
FIG. 5C

CHASSIS MOUNTING MEMBERS FOR AN ELECTRIC VEHICLE

CROSS-REFERENCE TO RELATED APPLICATIONS

This application claims the benefit of priority on U.S. Provisional Application No. 63/271,610 filed Oct. 25, 2021, the entire contents of which are incorporated by reference herein.

FIELD

Embodiments of the disclosure relate to the field of transportation, and more specifically, one embodiment of the disclosure relates to a mounting device infrastructure for an electrical vehicle.

GENERAL BACKGROUND

Multi-passenger transportation provides many benefits to individuals, communities, and the local economy. For decades, it has been widely recognized that multi-passenger transportation can reduce air pollution and traffic congestion that have plagued our cities, especially in high density areas. With advancements in battery technologies over the last few years, the electrification of public transportation and other multi-passenger transportation services is within our reach. The usage of mass-transit electric vehicles would assist us in making larger strides to mitigate carbon-monoxide (CO) emissions, a contributing factor in global climate change. But, to achieve consumer acceptance, mass-transit electric vehicles have to overcome a number of challenges.

One of the most daunting challenges is that most electric vehicles have a limited driving range between charging, especially for mass-transit electric vehicles. As mass-transit vehicles would require a greater amount of power to reliably operate, a series of battery packs will be needed to provide a sufficient driving range without recharging, so riders can rely on scheduled arrival and departure times. Unfortunately, in their current form, conventional chassis relied upon for building mass-transit vehicles are unable to safely maintain and protect a large number of battery packs, such as at least four battery packs for example, within a vehicle chassis. Moreover, to utilize struts and other types of cross members within a conventional chassis (e.g., a FORD® F-150 chassis), different mounting mechanisms are needed to support multiple battery packs placed in different orientations and at different locations throughout the chassis.

BRIEF DESCRIPTION OF THE DRAWINGS

Embodiments of the invention are illustrated by way of example and not by way of limitation in the figures of the accompanying drawings, in which like references indicate similar elements and in which:

FIGS. 5A-5C are exemplary embodiments of components forming a third mounting device to support and secure the third battery pack to the chassis of FIGS. 1-2.

DETAILED DESCRIPTION

Figure 1:
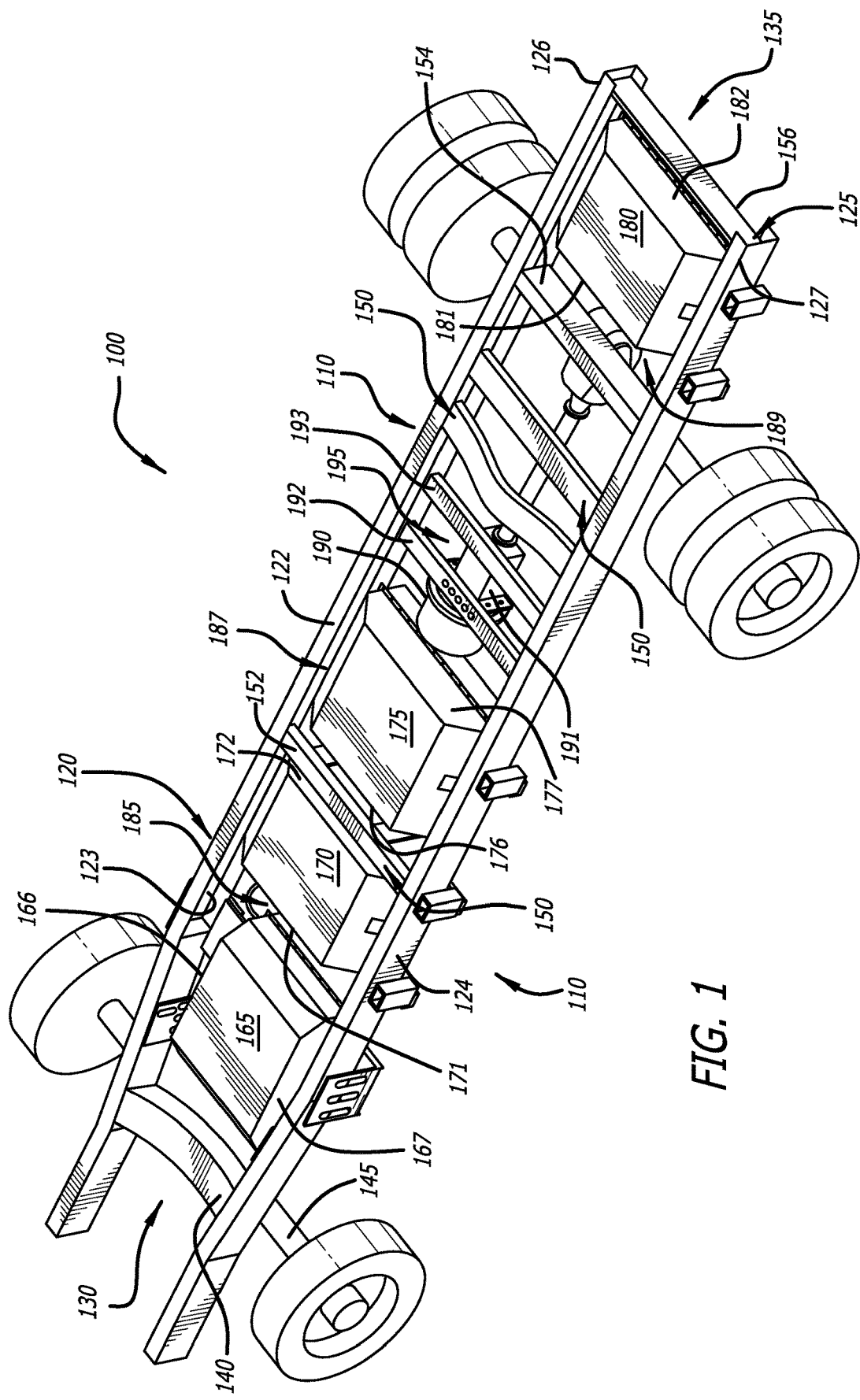
FIG. 1 is a perspective view of a chassis for an electric vehicle with electrification components installed on the chassis.

According to one embodiment of the disclosure, the infrastructure of a chassis that supports a multi-battery pack system for an electrical vehicle is described. The multi-battery pack system may be deployed within the chassis of the electrical vehicle as a four-battery pack system or a six-battery pack system, albeit the battery pack system may be deployed with a different number of battery packs without departing from the broader spirit and scope of the invention. Each of these battery packs may constitute a collection of battery cells organized into modules, where the battery modules are encased within a housing. For thermal management, the housing for each battery pack includes at least one inlet and at least one outlet to allow a flow of coolant to remove or add heat through conduction and convection.

More specifically, for a chassis configured to support a four-battery pack system as described below, each of the battery packs is supported by one or more mounting devices, which may be configured to span between a first member (referred to as a "first frame rail") and a second member (referred to as a "second frame rail") forming the chassis. The chassis extends from a front end of the electric vehicle inclusive of a cradle, which is used to support and secure a protective cage that is designed to protect power management logic, to a back end of the electric vehicle (behind a rear axle of the electric vehicle). Herein, two of the battery packs are deployed within a first installation area defined by the first frame rail, the second frame rail, the cradle of the chassis, and a first cross member positioned between the cradle and an electric motor of the vehicle. Of these two battery packs, a first battery pack is positioned in a longitudinal orientation, where a first widthwise side of a housing for the first battery pack faces the cradle. A second battery pack is positioned in a latitudinal orientation with lengthwise sides of the housing for the second battery pack being positioned orthogonal to each of the frame rails such as the second frame rail.

Additionally, a third battery pack is deployed within a second installation area defined by the first frame rail, the second frame rail, the first cross member, and the electric motor. The third battery pack is positioned in a latitudinal orientation, where a first widthwise side of the housing for the third battery pack faces the second frame rail. Similarly, a fourth battery pack is deployed within a third installation area defined by the first frame rail, the second frame rail, a second cross member situated adjacent to the rear axle, and a third cross member. The fourth battery pack is positioned in a latitudinal orientation, where a first widthwise side of the housing for the fourth battery pack is facing the second frame rail.

The orientation of the battery packs is arranged based on the infrastructure of the chassis. Herein, the chassis infrastructure is configured to accommodate three installation areas, where at least one installation area is sized to accommodate multiple battery packs. One or more of these installation areas is sized to accommodate a single battery pack. Each of these battery packs is secured within an installation area by one or more mounting devices, which are positioned under and attached to both a corresponding battery pack and the frame rails of a modified, automotive chassis. The mounting devices provide physical support of these battery packs to allow them to reside between the frame rail members. This chassis modifications described below are conducted for vehicle electrification without a complete redesign of the entire chassis.

For a six-battery pack system, each of the additional battery packs is implemented outside of the confines of the first and second frame rails of the chassis. Herein, similar to the four-battery pack system, the first and second battery packs are deployed within the first installation area, the third battery pack is deployed within the second installation area and the fourth battery pack is deployed within the third installation area, as described above. However, a fifth battery pack is installed along the first frame rail by a fifth mounting device to position the fifth battery pack in the first longitudinal orientation with a first widthwise side of a housing of the fifth battery directed towards a rear end of the electric vehicle. A sixth battery pack is positioned in a second longitudinal orientation that is rotated 180° from the first longitudinal orientation and is installed for coupling to a sixth mounting device affixed to an outside surface of the second frame rail.

I. Terminology

In the following description, certain terminology is used to describe aspects of the invention. In certain situations, the term "member" is a general representation of a mechanical structure while the term "logic" is representative of hardware and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial elements (AND gates, OR gates, NOR gates, NAND gates, or the like).

Alternatively, or in combination with the hardware circuitry described above, the logic may include software in the form of one or more software modules. The software modules may include an executable application, a daemon application, an application programming interface (API), a subroutine, a function, a procedure, a plug-in, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

An "electric vehicle" generally refers to a multi-passenger conveyance such as an automotive conveyance that is configured to at least partially rely on electrification for movement. Examples of different types of multi-passenger conveyances may include, but are not limited or restricted to a low-emission, plug-in multi-passenger electric vehicle such as an electric shuttle van, an electric bus, an electric limousine, an electric airplane, or the other multi-passenger vehicle that relies on electrification. However, it is contemplated that the electric vehicle may include an internal combustion engine to assist in propulsion of the vehicle.

A "chassis" generally refers to the main support structure of a vehicle to which other components are attached. Herein, the chassis includes a pair of frame rail members and one or more cross members. Each "frame rail member" is a component of a vehicle chassis that extends longitudinally along a driver-side or passenger-side of the vehicle exceeding in length a distance from the vehicle's front axle to a vehicle's back axle. A "cross member" generally refers to a component arranged for extending between and coupling to the pair of frame rail members forming the vehicle chassis. Collectively, the frame rail members and the cross member(s) for the chassis, which provides a support structure for the electric engine, vehicle body and other vehicle electrification components, may include mounting devices, such as mounting brackets or other types of fasteners, for supporting battery packs utilized by the electric vehicle.

The term "interconnect" generally refers to a means for conveyance of a prescribed composition within an electric vehicle, where the prescribed composition may include, but is not limited or restricted to electrical signaling (e.g., current and/or voltage generally referred to as "power"), coolant (e.g., a thermal-controlling solution, air, or other chemical mixture), or the like. As an illustrative example, a first interconnect may be configured to support the conveyance of high-voltage (HV) power ranging from approximately 200-800 volts and/or 100-500 amperes while a second interconnect may be configured to support the conveyance of coolant for heating or cooling electrification components, especially battery packs installed within the electric vehicle, through conduction and/or convection.

The terms "parallel" or "in parallel" are generally representative of a first member being substantially planar and equidistant from a second member, where an angular offset between the first and second members is no more than fifteen degrees (15°). Similarly, the term "orthogonal" is generally representative of a first member being perpendicular to or having an angular offset less than fifteen degrees from being perpendicular to a second member.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Vehicle-Based System Architecture

Referred to FIG. 1, a perspective view of an exemplary embodiment of a chassis 110 of an electric vehicle 100 is shown, where the chassis 110 is configured to support a four-battery pack system 160. Herein, the chassis 110 features frame rail members 120 extending in parallel from a front end 130 to a back end 135 of the electric vehicle 100. As shown, the parallel frame rail members 120 include a first frame rail 122 and a second frame rail 124, which are coupled to a conventional cradle 140 positioned to at least partially overlay a front axle 145 of the electric vehicle 100 and a plurality of conventional cross members 150 positioned at selected locations on the chassis 110. Herein, the first frame rail 122 is formed to feature a first channel 123 oriented inwardly in a direction towards the second frame rail 124. Similarly, the second frame rail 124 is formed to feature a second channel 125 oriented inwardly in a direction towards the first frame rail 122.

Figure 2:
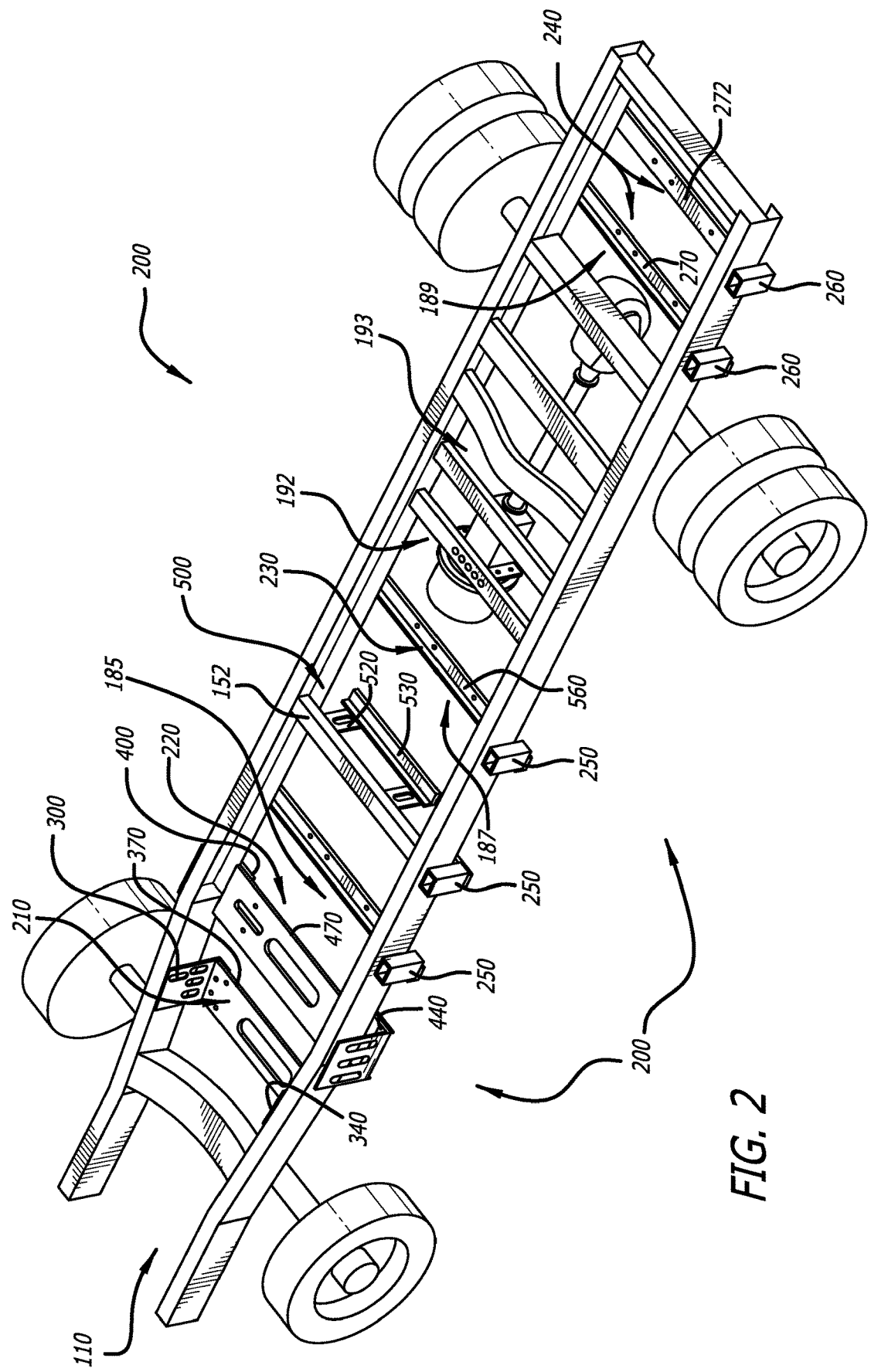
FIG. 2 is a perspective view of the chassis of FIG. 1 with mounting members attached to the chassis of the electric vehicle to secure the battery packs.

The four-battery pack system 160 includes a first battery pack 165, a second battery pack 170, a third battery pack 175 and a fourth battery pack 180, where all the battery packs are secured to the chassis 110 by mounting devices as illustrated in FIG. 2. Each of the battery packs 165, 170, 175 and 180 feature a housing for encasing a collection of battery cells such as lithium-ion cells (e.g., lithium-ion manganese oxide batteries being a lithium-ion cell that uses manganese dioxide ($MnO_2$) as the cathode material, lithium iron phosphate batteries, etc.).

According to one embodiment of the disclosure, as shown, the first battery pack 165 and the second battery pack 170 are installed within a first installation area 185 defined by the first frame rail 122, the second frame rail 124, the cradle 140 and a first cross member 152 being one of the plurality of cross members 150 that are part of a conventional chassis infrastructure. Herein, the first battery pack 165 is positioned with a longitudinal orientation, where lengthwise sides 166-167 of the first battery pack 165 are oriented to be generally in parallel with the first frame rail 122 and the second frame rail 124, respectively. In contrast, the second battery pack 170 is positioned with a latitudinal orientation, where lengthwise sides 171-172 of the second battery pack 170 are oriented to be generally orthogonal to the first frame rail 122 and the second frame rail 124. Hence, the first battery pack 165 is generally orthogonal to the second battery pack 170.

The third battery pack 175 is installed within a second installation area 187, which is defined by the first frame rail 122, the second frame rail 124, the first cross member 152 and an electric motor 190 that is part of a drivetrain 195 for the electric vehicle 100. According to this embodiment of the disclosure, the third battery pack 175 is positioned with a latitudinal orientation, where lengthwise sides 176-177 of the third battery pack 175 are oriented to be generally orthogonal to the first frame rail 122 and the second frame rail 124.

The fourth battery pack 180 is installed within a third installation area 189, which is defined by the first frame rail 122, the second frame rail 124, a second cross member 154 and a third cross member 156 that is coupled to end portions 126 and 127 of the first frame rail 122 and the second frame rail 124, respectively. According to this embodiment of the disclosure, the fourth battery pack 180 is positioned with a latitudinal orientation, where lengthwise sides 181-182 of the fourth battery pack 180 are oriented to be generally orthogonal to the first frame rail 122 and the second frame rail 124.

Referring still to FIG. 1, a pair of cross members, namely a fourth cross member 192 and a fifth cross member 193, are coupled to the first frame rail 122 and the second frame rail 124 at a position over the electric motor 190 and a gearbox 191 of the drivetrain 195. Herein, the fourth cross member 192 is configured to secure the electric motor 190 to the chassis 110. Similarly, the fifth cross member 193 is configured to secure the gearbox 191 to the chassis 110.

Referring now to FIG. 2, a perspective view of the chassis 110 of FIG. 1 with mounting devices 200 attached to the chassis 110 of the electric vehicle 100 to secure the battery packs 160 of FIG. 1 is shown. Herein, the mounting devices 200 includes a first mounting device 210 (see FIGS. 3A-3C) for supporting the first battery pack 165 of FIG. 1 and a second mounting device 220 (see FIGS. 4A-4C) that assists in supporting the first battery pack 165 of FIG. 1. The first mounting device 210 and the second mounting device 220 are situated within the first installation area 185.

The mounting devices 200 further include a third mounting device 230 (see FIGS. 5A-5C) situated within the second installation area 187 to support the third battery pack 175 of FIG. 1, and a fourth mounting device 240 situated within the third installation area 189 to support the fourth battery pack 180 of FIG. 1. One of the components of the third mounting device 230 may include an L-shaped bracket (e.g. bracket 560 of FIG. 5C), which is coupled and secured to the first frame rail 122 and the second frame rail 124 by a fastener. As shown, one of the fastener types may include a standoff 250 that is welded to the frame rail, and thereafter, coupled to the L-shaped bracket. Similarly, the fourth mounting device 240 may be a combination of L-shaped support brackets extending between the first frame rail 122 and the second frame rail 124. Standoffs 260 are welded to the second frame rail 125 to secure their corresponding L-shaped support brackets by standoffs 260 welding to the second frame rail 124 and their corresponding L-shaped support brackets 270 and 272. Each of the L-shaped support brackets 270 and 272 may be coupled to first frame rail 122 directly or via a pair of standoffs 260.

III. Mounting Device Architectures

A. First Mounting Device

Figure 3A:
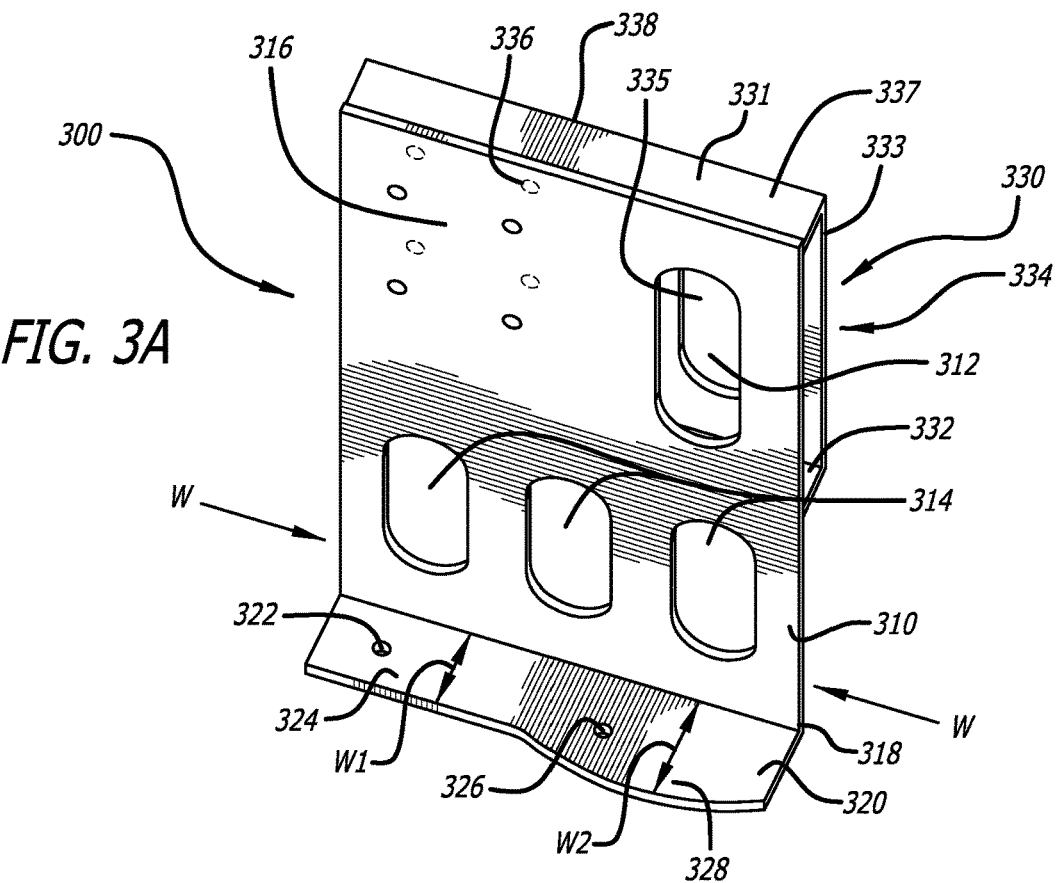
FIGS. 3A-3C are exemplary embodiments of components forming a first mounting device to support and secure a first battery pack to the chassis of FIGS. 1-2.
Figure 3B:
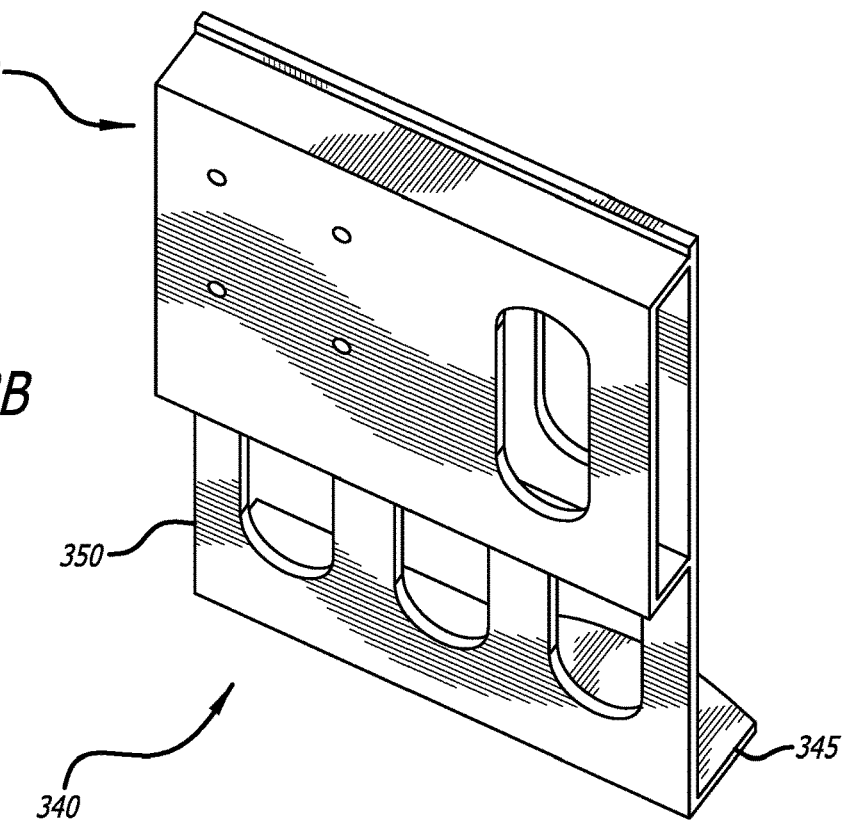
Figure 3C:
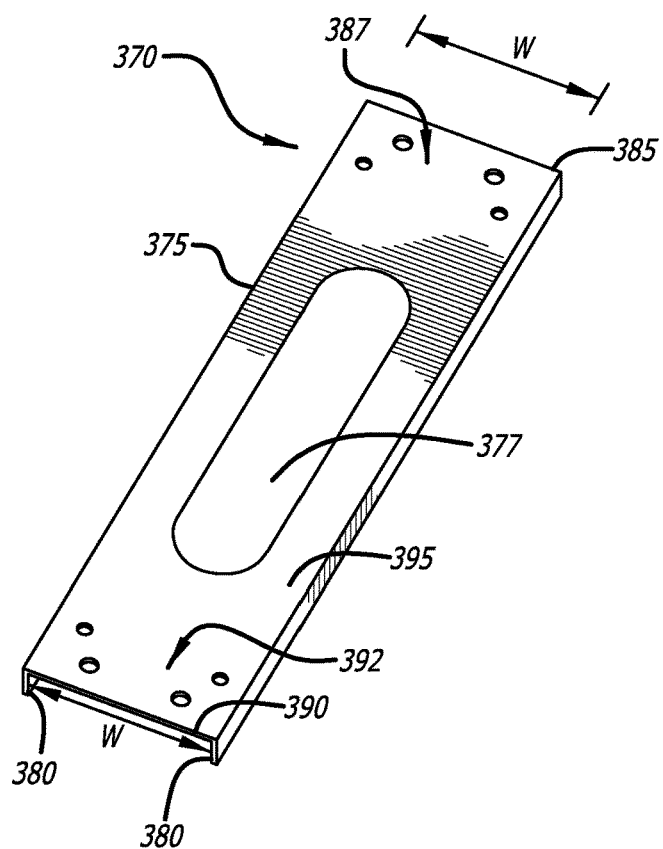

Referring to FIGS. 3A-3C, exemplary embodiments of components forming the first mounting device 210 to support and secure the first battery pack 165 to the chassis 110 of FIGS. 1-2 is shown. Herein, the components include a first mounting bracket 300, a second mounting bracket 340 and a first battery support member 370. Herein, the second mounting bracket 340 is a "mirrored" representation of the first mounting bracket 300 so that, when the first mounting bracket 300 is attached to an inner side of the first frame rail 122 and the second mounting bracket 340 is attached to an inner side of the second frame rail 124, openings and pre-drilled fastener holes of these brackets 300 and 340 are generally aligned.

As shown in FIG. 3A, the first mounting bracket 300 features an edge plate 310, an engagement plate 320, and an affixation member 330. The first mounting bracket 300 may be manufactured as a single, continuous bracket with the edge plate 310, the engagement plate 320, and the affixation member 330 being integrated portions of the first mounting bracket 300. Alternatively, the first mounting bracket 300 may be manufactured as an assembly of separate members that are coupled together by one or more fasteners to form the first mounting bracket 300. Herein, a fastener is generally described as a mechanism to physically connect a first member to a second member including, but not limited or restricted to a weld, mechanical fasteners (e.g., bolts, screws, rivets, pins, pegs, clamps, standoffs, etc.), adhesive, or the like The edge plate 310 is oriented vertically and features an opening 312, a plurality of cut-outs 314 and a first set of pre-drilled fastener apertures 316. The opening 312 is located horizontally adjacent to the pre-drilled fastener apertures 316 to avoid obstructing a mechanical connection to a component supported by the chassis 110, such as an axle strut or a mechanism associated with the braking system. According to one embodiment of the disclosure, the opening 312 features radii of curvature of approximately nineteen millimeters along with side lengths of approximately seventy-six millimeters.

The plurality of cut-outs 314 are positioned below the opening 312 and the first set of pre-drilled fastener apertures 316. Each of the cut-outs 314 includes radii of curvature of approximately nineteen millimeters along with side lengths of approximately fifty-one millimeters. The cut-outs 314 are separated from each other by 25 millimeters. The first set of pre-drilled fastener apertures 316 are arranged in a tiered representation and aligned with counterpart pre-drilled fastener apertures 336 formed within the affixation member 330.

More specifically, according to one embodiment of the disclosure, these cut-outs 314 are positioned in a generally uniform pattern across a width (W) of the edge plate 310. These cut-outs 314 are formed as part of the edge plate 310 for weight reduction, where the size and locations of these cut-outs 314 are based on a structural analysis of the edge plate 310 that reduces weight yet remains in compliance with governmental safety standards. As shown, the cut-outs 314 are rectangular shaped with rounded ends (e.g., capsule shaped) to avoid concentrating stresses on the edge plate 310 and remove an optimal amount of material for weight reduction.

The engagement plate 320 extends from a bottom edge 318 of the edge plate 310 and features a non-linear edge 321. Herein, the engagement plate 320 includes a first pre-drilled fastener aperture 322 placed within a first segment 324 of the engagement plate 320 and a second pre-drilled fastener aperture 326 placed within a second segment 328 of the engagement plate 320. The width (W1) of the first segment 324 of the engagement plate 320 is less than the width (W2) of the second segment 328 of the engagement plate 320 to achieve weight reduction while providing sufficient surface area to retain the first battery support member 370. In fact, the first segment 324 may be configured to feature less surface area than the second segment 328, due to a narrowing of the distance between the frame rail members 120 when approaching the front axle 145 from the first cross member 152 (and slight inward offset of the edge plate 310 from horizontal so that the first segment 324 is moved toward the battery pack 165 (when placed) and the second segment 328 is moved away from the battery pack (when placed) as shown in FIG. 1. The first and second pre-drilled fastener apertures 322 and 326 are placed into the engagement plate 320 to receive fasteners (e.g., bolts, screws, etc.) for use in attaching the first battery pack 165 thereto.

Referring still to FIG. 3A, the affixation member 330 includes a top flange 331, a bottom flange 332, and a connection plate 333 coupled to both the top flange 331 and the bottom flange 332 to form a generally rectangular-shaped conduit 334. The connection plate 333 includes at least a second opening 335 aligned with the opening 312 of the edge plate 310. Also, the connection plate 333 includes pre-drilled fastener apertures 336, which are assigned with the pre-drilled fastener apertures 316 of the edge plate 310.

Herein, the affixation member 330 also may be sized and formed to account for an inward, angular change of the chassis frame rail members 122 and 124 towards the front end 130 of the vehicle as shown in FIG. 2. For instance, although not shown, according to one embodiment of the disclosure, areas of the top flange 331 and the bottom flange 332 proceeding toward an outermost edge 337 may be gradually widened by a prescribed amount so that a back edge 337 is inwardly offset by an angle θ (narrowing angle associated with each frame rail) to enable the edge plate 310 to remain substantially planar or flush ("square") to the lengthwise side 166 of the battery pack 165 as shown in FIG. 1. Also, the affixation member 330 allows for at least partial insertion into and attachment to the first channel 123 of the first frame rail 122 through the pre-drilled fastener apertures 316 and 336 while allowing power interconnects to be continuously routed through the first channel 123 of the first frame rail 122 by traversing through the rectangular-shaped conduit 334 as shown in FIGS. 1-2.

Referring now to FIG. 3B, the second mounting bracket 340 is a mirrored representation of the first mounting bracket 310 and includes an edge plate 345, an engagement plate 350, and an affixation member 360. The edge plate 345, the engagement plate 350, and the affixation member 360 are identical in structure to the edge plate 310, the engagement plate 320, and the affixation member 330 of the first mounting bracket 300 of FIG. 3A, and thus, the description of the first mounting bracket 310 is applicable to the second mounting bracket 340.

Referring to FIG. 3C, the first battery support member 370 includes a first support plate 375 with a pair of raised edges 380 positioned along the edges of the first support plate 375 and a cut-out 377 formed in the first support plate 375. The cut-out 377 provides a number of advantages, including increased air circulation to a bottom surface of the battery pack 160 when installed on the first support plate 375 and reduced weight of the first support plate 375. Weight reduction has a correlation with increased driving distance and duration for an electric vehicle.

At a first end segment 385 of the first battery support member 370, a width (W) of the first support plate 375 between raised edges 380 is configured to receive the engagement plate 320 of the first mounting bracket 300. Similarly, at a second end segment 390 of the first battery support member 370, the width W of the first support plate 375 between the raised edges 380 is configured to receive the engagement plate 350 of the second mounting bracket 340.

In particular, according to one embodiment of the disclosure, the pair of raised edges 380 are oriented downward to increase rigidity at the first end segment 385 and the second end segment 390 as well as form a channel to receive the engagement plate 320 of the first mounting bracket 300 and the engagement plate 350 of the second mounting bracket 340. The first end segment 385 of the first battery support member 370 includes a first set of pre-drilled fastener apertures 387, and the second end segment 390 of the first battery support member 370 includes a second set of pre-drilled fastener apertures 392. The second set of pre-drilled fastener apertures 392 is arranged as a "mirrored" image of the first set of pre-drilled fastener apertures 387, where both the first set of pre-drilled fastener apertures 387 and the second set of pre-drilled fastener apertures 392 are configured to align with pre-drilled fastener apertures within either of the engagement plates 320/350 and fastening components formed in a housing within the first battery pack 165 of FIG. 1. The first battery pack (not shown) rests on a top surface 395 of the first support plate 375.

B. Second Mounting Device

Figure 4A:
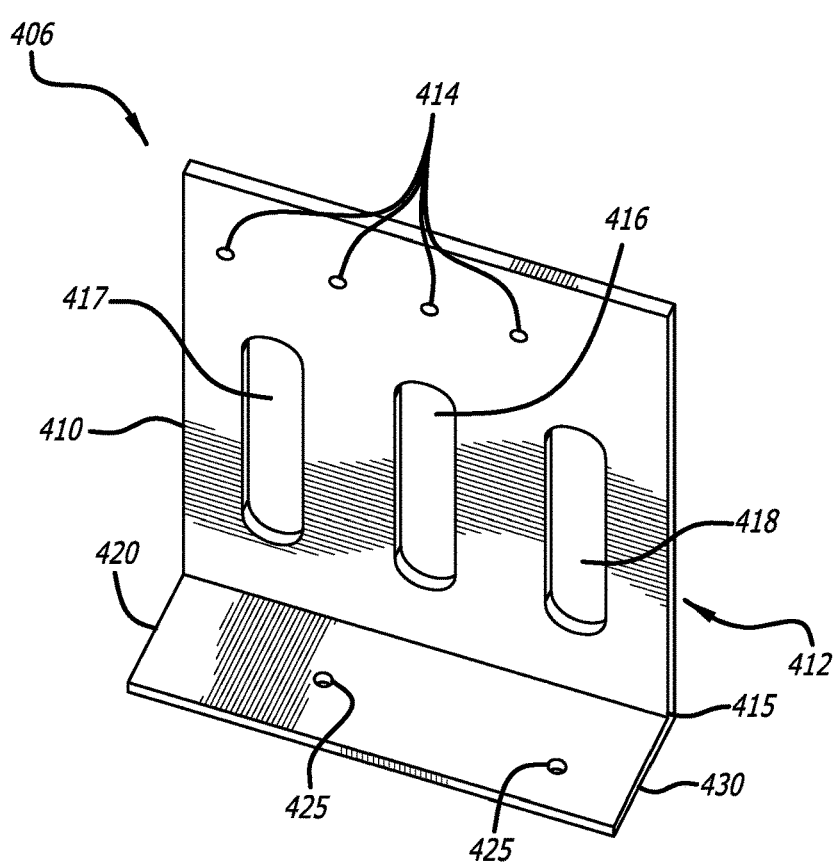
FIGS. 4A-4C are exemplary embodiments of components forming a second mounting device to support and secure the second battery pack to the chassis of FIGS. 1-2.
Figure 4B:
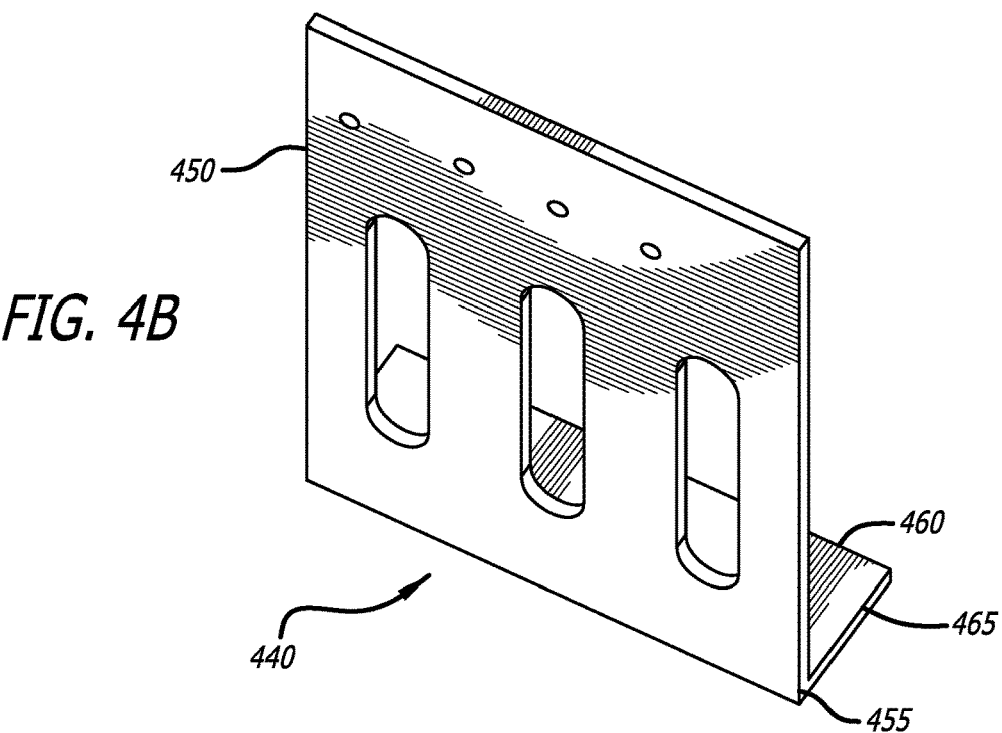
Figure 4C:
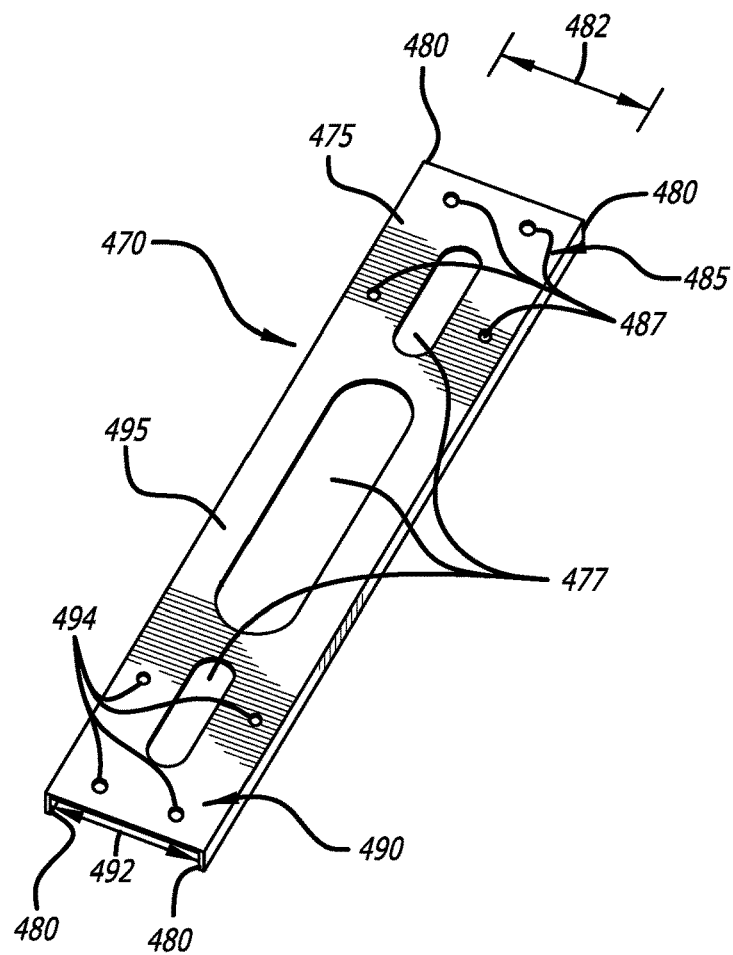

Referring now to FIGS. 4A-4C, exemplary embodiments of components forming the second mounting device 220 is shown, where the second mounting device 220 is configured to support and secure the first battery pack 165 to the chassis as shown in FIGS. 1-2. Herein, the components of the second mounting device 220 include a third mounting bracket 400, a fourth mounting bracket 440 and a second battery support member 470. Herein, the fourth mounting bracket 440 is a "mirrored" representation of the third mounting bracket 400 so that, when the third mounting bracket 400 is attached to an outer side the first frame rail 122 and the fourth mounting bracket 440 is attached to an outer side of the second frame rail 124, pre-drilled fastener apertures within these brackets 400 and 440 are aligned with apertures within the frame rail members 122 and 124.

As shown in FIG. 4A, the third mounting bracket 400 features an edge plate 410 and an engagement plate 420. The third mounting bracket 400 may be manufactured as a single, continuous bracket with the edge plate 410 and the engagement plate 420 being integrated portions of the third mounting bracket 400. Alternatively, the third mounting bracket 400 may be manufactured as an assembly of separate members that are coupled together by one or more fasteners to form the third mounting bracket 400.

The edge plate 410 is oriented vertically and features a plurality of cut-outs 412 arranged horizontally and a first set pre-drilled fastener apertures 414. The plurality of cut-outs 412 are positioned below the first set of pre-drilled fastener apertures 414. The plurality of cut-outs 412 are sized and located based on a structural analysis of the edge plate 410. Herein, according to one embodiment of the disclosure, the cut-outs 412 are capsule shaped with a second cut-out 416 configured to be equidistant from a first cut-out 417 and a third cut-out 418 of the plurality of cut-outs 412. This cut-out architecture is selected to optimize weight reduction and remain in compliance with governmental safety standards. Additionally, the first set of pre-drilled fastener apertures 414 are oriented in a prescribed pattern (e.g., a horizontal linear pattern) to align with fastener apertures (not shown) within the first frame rail 122 of FIGS. 1-2.

The engagement plate 420 extends from a bottom edge 415 of the edge plate 410. The engagement plate 420 includes a second set of pre-drilled fastener apertures 425. A width 430 of the engagement plate 420 is sized so that the second battery support member 470 extends under the first frame rail 122 towards the outer side of the first frame rail 122. Hence, the engagement plate 420 is attached to the second battery support member 470 outside of the first installation area 185 (e.g., under the first frame rail 122). Hence, neither the edge plate 410 nor the engagement plate 420 interferes with the routing of the interconnects through the first channel 123 of the first frame rail 122.

Referring now to FIG. 4B, the fourth mounting bracket 440 is a mirrored representation of the third mounting bracket 410 and includes an edge plate 450 and an engagement plate 460. The edge plate 450 and the engagement plate 460 are identical in structure to the edge plate 410 and the engagement plate 420 of the third mounting bracket 400 of FIG. 4A. In particular, the engagement plate 460 extends from a bottom edge 455 of the edge plate 450, where a width 465 of the engagement plate 460 is sized so that, when the fourth mounting bracket 440 is attached to an outer side of the second frame rail 124, the engagement plate 460 at least partially extend under the second frame rail 124 for coupling to the second battery support member 470. Hence, the engagement plate 460 may be attached to the second battery support member 470 outside of the first installation area 185 (e.g., under the second frame rail 124). Hence, neither the edge plate 450 nor the engagement plate 460 interferes with the routing of the interconnects through the second channel 125 of the second frame rail 124.

Referring to FIG. 4C, the second battery support member 470 includes a second support plate 475 with a pair of raised edges 480 positioned along the edges of the second support plate 475 and a plurality of cut-outs 477. These cut-outs 477 provide for air circulation to a bottom surface of the first battery pack 165 installed on the second support plate 475 and further weight reduction as described above. Furthermore, at a first end segment 485 of the second battery support member 470, a width 482 of the second support plate 475 between raised edges 480 is configured to receive the engagement plate 420 of the third mounting bracket 400. Similarly, at a second end segment 490 of the second battery support member 470, a width 492 of the second support plate 475 between raised edges 480 is configured to receive the engagement plate 450 of the fourth mounting bracket 440.

According to one embodiment of the disclosure, the pair of raised edges 480 may be oriented downward to form a channel to receive the engagement plate 420 of the third mounting bracket 400 and the engagement plate 460 of the fourth mounting bracket 440. The first end segment 485 of the first battery support member 470 includes a second set of pre-drilled fastener apertures 487, and the second end segment 490 of the second battery support member 470 includes a third set of pre-drilled fastener apertures 494. The third set of pre-drilled fastener apertures 494 are arranged as a "mirrored" image of the second set of pre-drilled fastener apertures 487, where both the second set of pre-drilled fastener apertures 487 and the third set of pre-drilled fastener apertures 494 are configured to align with pre-drilled fastener apertures within the engagement plates 420/460. The first battery pack (not shown) rests on a top surface 495 of the second support plate 475.

C. Third Mounting Device

Referring to FIGS. 5A-5C, exemplary embodiments of components forming the third mounting device 230, which supports and secures the third battery pack 175 to the chassis 110 of FIGS. 1-2, are shown. More specifically, a first portion of the third mounting device 230 includes a pair of hanging brackets (e.g., first hanging bracket 500) and a first L-shaped support bracket 530. Each of the hanging brackets, such as the first hanging bracket 500, is attached to the first cross member 152 of the chassis 110, where the first cross member 152 is one of the plurality of conventional cross members 150. A first end 550 of the support bracket 530 is attached to the first hanging bracket 500 while a second end 555 of the support bracket 530 would be attached to the other hanging bracket.

As shown in FIG. 5C, a second portion of the third mounting device 230 is another L-shaped support bracket 560 with a first end 570 situated outside the channel 123 and under the first frame rail 122. The first end 570 of the support bracket 560 may be attached to a fastener (e.g., standoff) attached to an outer surface of the first frame rail 122 that is opposite the first channel 123. Similarly, a second end 580 of the support bracket 560 may be attached to a fastener (e.g., a standoff 250) on outer surface of the second frame rail 124 that is opposite from the second channel 125.

More specifically, as shown in FIG. 2 and FIG. 5A, the first hanging bracket 500 is oriented orthogonal to the first cross member 152. The hanging bracket 500 includes an opening 510 interposed between a flange 515 and a first set of pre-drilled fastener apertures 520. The opening 510 is positioned above the first set of pre-drilled fastener apertures 520. The opening 510 may be configured to allow mechanical components of the chassis 110 or an interconnect (e.g., high-voltage interconnect, etc.). The flange 515 includes a second set of pre-drilled fastener apertures 525 to be aligned with a prescribed pattern of fastener apertures (not shown) within the first cross member 152. Also, the first set of pre-drilled fastener apertures 520 is patterned to be aligned to a third set of pre-drilled fastener apertures 590 associated with the support bracket 530.

As shown in FIG. 5B, according to one embodiment of the disclosure, the support bracket 530 may be configured as a L-shaped bracket with a first raised edge 540 and a support flange 545 oriented generally orthogonal to the first raised edge 540. The third set of pre-drilled fastener apertures 590 is positioned on the first raised edge 540 for alignment with the first set of pre-drilled fastener apertures 520 of the hanging bracket 500 while the apertures 595 in the support flange 545 are used for fastening the support bracket 530 to the third battery pack 166 prior to installation on the chassis 110. Therefore, after a fastener (e.g., bolt/nut combination, etc.) is inserted through the first and third sets of pre-drilled fastening apertures 540/590 and secured, the support bracket 530 is effectively coupled to the first cross member 152 to partially support the third battery pack (not shown).

In the foregoing description, the invention is described with reference to specific exemplary embodiments thereof. However, it will be evident that various modifications and changes may be made thereto without departing from the broader spirit and scope of the invention.

What is claimed is:

1. An electric vehicle chassis extending at least from a front axle to a rear axle of an electric vehicle, the electric vehicle chassis comprising:
   a first frame rail including (i) a first segment and (ii) a second segment positioned at least partially above the front axle;
   a second frame rail including (i) a first segment and (ii) a second segment positioned at least partially above the front axle, wherein a distance between the second segment of the first frame rail and the second segment of the second frame rail is less than a distance between the first segment of the first frame rail and the first segment of the second frame rail;
   a plurality of battery packs including a first battery pack of the plurality of battery packs positioned between the second segment of first frame rail and the second segment of the second frame rail; and
   a first mounting device including a battery support member and a pair of mounting brackets each including an edge plate that is arranged to be proximate to a lengthwise side of the first battery pack when installed, an engagement plate to engage with the battery support member adapted to support the first battery pack, and an affixation member that is installed and oriented to retain the edge plate flush with the lengthwise side of the first battery pack despite the second segments being inwardly angled.

2. The electric vehicle chassis of claim 1, wherein the edge plate includes an aperture aligned with an aperture of the affixation member to allow for a mechanism to be inserted there through.

3. The electric vehicle chassis of claim 2, wherein the edge plate further includes a plurality of cut-outs positioned under the aperture and a pattern of pre-drilled apertures.

4. The electric vehicle chassis of claim 1, wherein the affixation member comprises includes a top flange, a bottom flange, and a connection plate coupled to both the top flange and the bottom flange to form a generally rectangular-shaped conduit with a portion of the engagement plate.

5. The electric vehicle of claim 4, wherein the engagement plate includes a varying width to maintain the edge plate generally in parallel with the lengthwise side of the first battery pack.

6. The electric vehicle chassis of claim 1 further comprising a second mounting device include a pair of hanging brackets and a first L-shaped support bracket attached to the pair of hanging brackets and a second L-shaped support bracket vertically aligned with the first L-shaped support bracket.

7. An electric vehicle chassis extending at least from a front axle to a rear axle of an electric vehicle, the electric vehicle chassis comprising:
   a first frame rail;
   a second frame;
   a plurality of battery packs including a first battery pack of the plurality of battery packs positioned between the first frame rail and the second frame rail; and
   a first mounting device including a battery support member and a pair of mounting brackets each including (i) an edge plate that is arranged to be proximate to a lengthwise side of the first battery pack when installed, (ii) an engagement plate to engage with the battery support member adapted to support the first battery pack, and (iii) an affixation member that is installed and oriented on a location of the first frame rail or the second frame rail to retain the edge plate flush with the lengthwise side of the first battery pack despite changes in distance between the first frame rail and the second frame rail along the location of the first frame rail or the second frame rail.

8. The electric vehicle chassis of claim 7, wherein the edge plate includes an aperture aligned with an aperture of the affixation member to allow for a mechanism to be inserted there through.

9. The electric vehicle chassis of claim 7, wherein the edge plate further includes a plurality of cut-outs positioned under the aperture and a pattern of pre-drilled apertures.

10. The electric vehicle chassis of claim 7, wherein the affixation member comprises includes a top flange, a bottom flange, and a connection plate coupled to both the top flange and the bottom flange to form a generally rectangular-shaped conduit with a portion of the engagement plate.

11. The electric vehicle of claim 10, wherein the engagement plate includes a varying width to maintain the edge plate generally in parallel with the lengthwise side of the first battery pack.

12. The electric vehicle chassis of claim 7 further comprising a second mounting device include a pair of hanging brackets and a first L-shaped support bracket attached to the pair of handling brackets and a second L-shaped support bracket vertically aligned with the first L-shaped support bracket.

13. A first mounting device comprising:
   a battery support member; and
   a pair of mounting brackets including at least a first mounting bracket including (i) an edge plate that is arranged to be proximate to a lengthwise side of the first battery pack when installed, (ii) an engagement plate to engage with the battery support member adapted to support the first battery pack, and (iii) an affixation member that is installed and oriented on a location of the first frame rail or the second frame rail to retain the edge plate flush with the lengthwise side of the first battery pack despite changes in distance between the first frame rail and the second frame rail along the location of the first frame rail or the second frame rail.

* * * * *